(12) United States Patent
Arthur et al.

(10) Patent No.: US 8,473,439 B2
(45) Date of Patent: Jun. 25, 2013

(54) INTEGRATE AND FIRE ELECTRONIC NEURONS

(75) Inventors: John V. Arthur, Mountain View, CA (US); Gregory S. Corrado, San Francisco, CA (US); Steven K. Esser, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/963,558

(22) Filed: Dec. 8, 2010

(65) Prior Publication Data

US 2012/0150781 A1 Jun. 14, 2012

(51) Int. Cl.
*G06N 5/00* (2006.01)
(52) U.S. Cl.
USPC .............................................. 706/35; 706/45
(58) Field of Classification Search
USPC ..................................................... 706/35, 45
See application file for complete search history.

(56) References Cited

U.S. PATENT DOCUMENTS

| | | | |
|---|---|---|---|
| 4,518,866 A | 5/1985 | Clymer | |
| 4,974,169 A | 11/1990 | Engel | |
| 5,148,385 A | 9/1992 | Frazier | |
| 5,185,851 A | 2/1993 | Furuta et al. | |
| 5,201,029 A | 4/1993 | Jackson | |
| 5,630,023 A | 5/1997 | Oteki | |
| 5,963,930 A | 10/1999 | Stork et al. | |
| 6,292,023 B1 | 9/2001 | Herrera et al. | |
| 6,496,815 B1 | 12/2002 | Kawashima | |
| 7,054,850 B2 | 5/2006 | Matsugu | |
| 7,174,325 B1 | 2/2007 | Ascoli | |
| 7,430,546 B1 | 9/2008 | Suri | |
| 7,512,572 B2 | 3/2009 | Furber | |
| 2009/0287624 A1 | 11/2009 | Rouat et al. | |

OTHER PUBLICATIONS

Izhikevich, Which Model to Use for Cortical Spiking Neurons?, IEEE Transactions on Neural Networks, vol. 15, No. 5, 2004, pp. 1063-1070.*
Schoenauer, T. et al., "NeuroPipe-Chip: A Digital Neuro-Processor for Spiking Neural Networks," IEEE Transactions on Neural Networks, vol. 13, No. 1, IEEE, Jan. 2002, pp. 205-213, United States.
Tomlinson, M.S., Jr., et al., "A Digital Neural Network Architecture for VLSI," 1990 International Joint Conference on Neural Networks (IJCNN 1990), vol. 2, IEEE, Jun. 1990, pp. 545-550, United States.
Hirai, Y. et al., "A Digital Neuro-Chip with Unlimited Connectability for Large Scale Neural Networks," 1989 International Joint Conference on Neural Networks (IJCNN 1989), vol. 2, IEEE, Jun. 1989, pp. 163-169, United States.

(Continued)

*Primary Examiner* — Wilbert L Starks
(74) *Attorney, Agent, or Firm* — Kenneth L. Sherman, Esq.; Michael Zarrabian, Esq.; Sherman & Zarrabian LLP

(57) ABSTRACT

An integrate and fire electronic neuron is disclosed. Upon receiving an external spike signal, a digital membrane potential of the electronic neuron is updated based on the external spike signal. The electric potential of the membrane is decayed based on a leak rate. Upon the electric potential of the membrane exceeding a threshold, a spike signal is generated.

25 Claims, 15 Drawing Sheets

OTHER PUBLICATIONS

Eguchi, H. et al., "Neural Network LSI Chip with On-Chip Learning," 1991 International Joint Conference on Neural Networks (IJCNN 1991), vol. 1, IEEE, Jul. 1991, pp. 453-456, United States.

Chen, L. et al., "CMOS PWM VLSI Implementation of Neural Network," Proceedings of the 2000 IEEE-INNS-ENNS International Joint Conference on Neural Networks (IJCNN 2000), vol. 3, IEEE, Jul. 2000, pp. 485-488, United States.

Indiveri, G., "A Low-Power Adaptive Integrate-and-Fire Neuron Circuit," Proceedings of the 2003 International Symposium on Circuits and Systems (ISCAS 2003), vol. 4, IEEE, May 2003, pp. 820-823, United States.

Inigo, R.M. et al., "Analog Hardware Implementation of Neocogitron Networks," Proceedings of the SPIE Conference on Applications of Artificial Neural Networks, vol. 1294, SPIE, Aug. 1, 1990, Abstract Only, United States.

Yasunaga, M. et al., "Design, Fabrication and Evaluation of a 5-Inch Wafer Scale Neural Network LSI Composed on 576 Digital Neurons," 1990 International Joint Conference on Neural Networks (IJCNN 1990), vol. 2, IEEE, Jun. 1990, pp. 527-535, United States.

Douglas, R.J. et al., "Hybrid Analog-Digital Architectures for Neuromorphic Systems," 1994 IEEE International Conference on Neural Networks, IEEE World Congress on Computational Intelligence (ICNN 1994), IEEE, Jun.-Jul. 1994, pp. 1848-1853, United States.

Murray, A.F. et al., "Pulse-Stream VLSI Neural Networks Mixing Analog and Digital Techniques," IEEE Transactions on Neural Networks, vol. 2, No. 2, IEEE, Mar. 1991, pp. 193-204, United States.

Liu, S. et al., "Temporal Coding in a Silicon Network of Integrate-and-Fire Neurons," IEEE Transactions on Neural Networks, vol. 15, No. 5, IEEE, Sep. 2004, pp. 1305-1314, United States.

Sheu, B.J., "VLSI Neurocomputing with Analog Programmable Chips and Digital Systolic Array Chips," 1991 IEEE International Symposium on Circuits and Systems, vol. 2, IEEE, Jun. 1991, pp. 1267-1270, United States.

Likharev, K.K., "Hybrid CMOS/Nanoelectronic Circuits: Opportunities and Challenges," Journal of Nanoelectronics and Optoelectronics, vol. 3, American Scientific Publishers, 2008, pp. 203-230, United States.

* cited by examiner

INTEGRATE AND FIRE ELECTRONIC NEURONS

This invention was made with Government support under Agreement No. HR0011-09-C-0002 awarded by Defense Advanced Research Projects Agency (DARPA). The Government has certain rights in the invention.

BACKGROUND

The present invention relates generally to neuromorphic and synaptronic systems, and more specifically to neuromorphic and synaptronic systems based on spike-timing dependent plasticity.

Biological systems impose order on the information provided by their sensory input. This information typically comes in the form of spatiotemporal patterns comprising localized events with a distinctive spatial and temporal structure. These events occur on a wide variety of spatial and temporal scales, and yet a biological system such as the brain is still able to integrate them and extract relevant pieces of information. Such biological systems can rapidly extract signals from noisy spatiotemporal inputs.

In biological systems, the point of contact between an axon of a neuron and a dendrite on another neuron is called a synapse, and with respect to the synapse, the two neurons are respectively called pre-synaptic and post-synaptic. Neurons, when activated by sufficient inputs received via synapses, emit "spikes" that are delivered to those synapses that the neuron is pre-synaptic to. Neurons can be either "excitatory" or "inhibitory." Synaptic conductance is a measure of amount of influence a synapse will have on its post-synaptic target when the synapse is activated by a pre-synaptic spike. The synaptic conductance can change with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed. The essence of our individual experiences is stored in the conductance of the trillions of synapses throughout the brain.

Neuromorphic and synaptronic systems, also referred to as artificial neural networks, are computational systems that permit electronic systems to essentially function in a manner analogous to that of biological brains. Neuromorphic and synaptronic systems create connections between processing elements that are roughly functionally equivalent to neurons of a biological brain. Neuromorphic and synaptronic systems may comprise various electronic circuits that are modeled on biological neurons.

BRIEF SUMMARY

Embodiments of the invention provide integrate and fire electronic neurons. In one embodiment, upon receiving an external spike signal, a digital counter representing a neuron membrane potential is updated based on the external spike signal. The membrane potential is decayed based on a leak rate. Upon the membrane potential exceeding a threshold, a spike signal is generated. The membrane potential corresponds to that of the membrane potential (voltage) in a biological neuron.

In another embodiment, a mixed-mode, digital-analog electronic neuron is provided, wherein upon receiving an external excitatory spike signal, the digital membrane potential is incremented by an increment using bit-wise operations such that only bits in the counter that need change are modified. Further, upon receiving an external inhibitory spike signal, the membrane potential is decremented by a decrement using bit-wise operations such that only bits in the counter that need change are modified. Further, the membrane potential is decayed based on a time constant using an analog resistor-capacitor model.

In one embodiment, increasing the membrane potential is by an increment equal to the number of excitatory spike signals received in a time step, multiplied by a scaling parameter. In one example, the scaling parameter is restricted to multiples of 2, such that the scaling (i.e., multiplication) of the number of excitatory spikes received by the scaling factor is performed through a bit shift operation.

In one embodiment, decreasing the membrane potential is by a decrement equal to the number of inhibitory spikes received in a time step, multiplied by a scaling parameter. The scaling parameter is restricted to multiples of 2, such that the multiplication of the number of inhibitory spikes received by the scaling factor is performed through a bit shift operation.

In another embodiment, an event driven electronic neuron is provided wherein when an excitatory event type occurs, the digital membrane potential is incremented by an excitatory synaptic strength increment. When an inhibitory event type occurs, the digital membrane potential is decremented by an inhibitory synaptic strength decrement. When a decay event type occurs, the digital membrane potential is decremented by a leak strength decrement.

These and other features, aspects and advantages of the present invention will become understood with reference to the following description, appended claims and accompanying figures.

DETAILED DESCRIPTION

Embodiments of the invention provide neuromorphic and synaptronic systems comprising integrate and fire neurons. Integrate and fire electronic neurons are a computationally efficient mechanism of simulating the integrative and spiking properties found in biological neurons. Such electronic neurons operate by integrating synaptic inputs into a membrane potential voltage variable and producing a spike and voltage reset if the membrane potential voltage exceeds a threshold. Embodiments of the invention further provide leaky integrate-and-fire neuron models implementable in software simulation and in hardware simulation in custom digital circuits, enabling exact one-to-one software-hardware correspondence.

Figure 1:
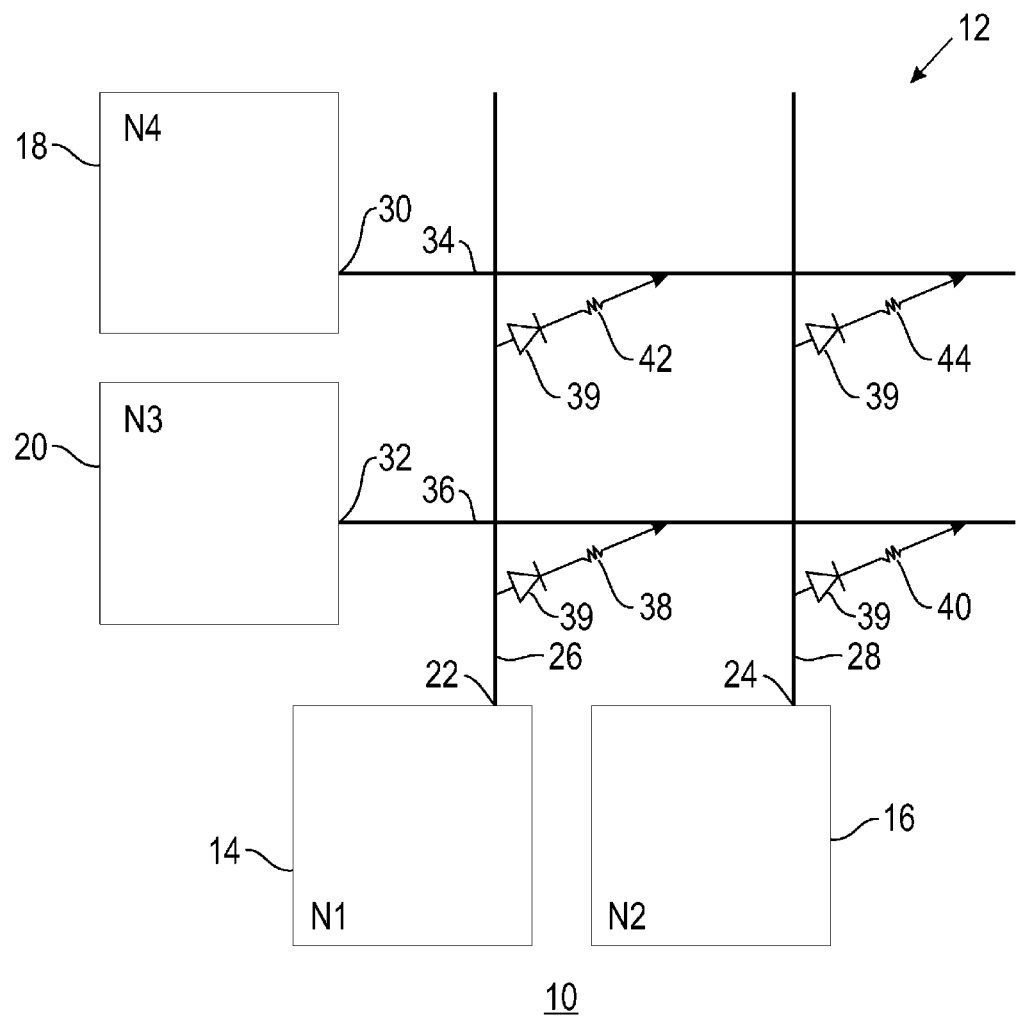
FIG. 1 shows diagram of a neuromorphic and synaptronic system having a crossbar array interconnecting integrate and fire electronic neurons, in accordance with an embodiment of the invention.

Referring now to FIG. 1, there is shown a diagram of a neuromorphic and synaptronic system 10 having a crossbar array interconnecting integrate and fire electronic neurons, in accordance with an embodiment of the invention. In one example, the crossbar array may comprise an ultra-dense cross-bar array that may have a pitch in the range of about 0.1 nm to 10 μm. The neuromorphic and synaptronic system 10 includes a crossbar array 12 having a plurality of integrate and fire neurons 14, 16, 18 and 20, in accordance with an embodiment of the invention. These neurons are also referred to herein as "electronic neurons". Neurons 14 and 16 are axonal neurons and neurons 18 and 20 are dendritic neurons.

Axonal neurons 14 and 16 are shown with outputs 22 and 24 connected to electrically conductive axon paths/wires (axons) 26 and 28, respectively. Dendritic neurons 18 and 20 are shown with inputs 30 and 32 connected to electrically conductive dendrite paths/wires (dendrites) 34 and 36, respectively. Axonal neurons 14 and 16 also contain inputs and receive signals along dendrites, however, these inputs and dendrites are not shown for simplicity of illustration. Thus, the axonal neurons 14 and 16 will function as dendritic neurons when receiving inputs along dendritic connections. Likewise, the dendritic neurons 18 and 20 will function as axonal neurons when sending signals out along their axonal connections. When any of the neurons 14, 16, 18 and 20 fire, it will send a pulse out to its axonal and to its dendritic connections. As used herein, the term "when" can mean that a signal is sent instantaneously after a neuron fires, or some period of time after the neuron fires.

Each connection between axons 26, 28 and dendrites 34, 36 are made through synapse devices, which in one embodiment comprise variable state resistor 38, 40, 42 and 44. The junctions where the variable state resistors are located may be referred to herein as "cross-point junctions". The term "variable state resistor" refers to a class of devices in which the application of an electrical pulse (either a voltage or a current) will change the electrical conductance characteristics of the device. For a general discussion of cross-bar array neuromorphic and synaptronic systems as well as of variable state resistors as used in such cross-bar arrays, reference is made to K. Likharev, "Hybrid CMOS/Nanoelectronic Circuits: Opportunities and Challenges", J. Nanoelectronics and Optoelectronics, 2008, Vol. 3, p. 203-230, 2008, which is hereby incorporated by reference. In one embodiment of the invention, the variable state resistor may comprise a phase change memory (PCM). Besides PCM devices, other variable state resistor devices that may be used in embodiments of the invention include devices made using metal oxides, sulphides, silicon oxide and amorphous silicon, magnetic tunnel junctions, floating gate FET transistors, and organic thin film layer devices, as described in more detail in the above-referenced article by K. Likharev. The variable state resistor may also be constructed using a static random access memory device. Also attached to the variable state resistors is an access device 39, which may comprise a PN diode, an FET wired as a diode, or some other element with a nonlinear voltage-current response.

In general, in accordance with an embodiment of the invention, axonal neurons 14 and 16 will "fire" (transmit or emit a pulse) when the inputs they receive from dendritic input connections (not shown) exceed a threshold. When axonal neurons 14 and 16 fire they maintain an A-STDP variable that decays over time (e.g., about 50 msec). The A-STDP variable decays as a function of time according to functions such as, for example, exponential, linear, polynomial, or quadratic functions. The A-STDP variable may be sampled. In another embodiment of the invention, the A-STDP variable may increase instead of decreasing over time.

The A-STDP variable is used to achieve axonal STDP, by encoding the time since the last firing of the associated neuron. Axonal STDP is typically used to control "potentiation", which in this context is defined as increasing synaptic conductance, but may be used to control "depression", which in this context refers to decreasing synaptic conductance. When dendritic neurons 18, 20 fire they maintain a D-STDP variable that decays over time (e.g., about 50 msec). The D-STDP variable decays as a function of time according to functions such as, for example, exponential, linear, polynomial, or quadratic functions. The D-STDP variable may be sampled. In another embodiment of the invention, the variable may increase instead of decrease over time.

The D-STDP variable may be used to achieve dendritic STDP, by encoding the time since the last firing of the associated neuron, as discussed in more detail below. Dendritic STDP is typically used to control "depression", which in this context is defined as decreasing synaptic conductance, but may be used to control "potentiation", which in this context refers to increasing synaptic conductance.

In one embodiment, the invention provides integrate and fire electronic neurons that are implemented utilizing digital circuitry. A first implementation comprises an integrate and fire neuron that uses a linear-leak circuit and linear point-current type synapse devices. A second implementation involves replacing the linear-leak circuit with a convex voltage decay circuit and further utilizes a refractory period. A third implementation involves adding conductance-based inhibition. A fourth implementation implements dual-exponential conductance based synapses. These example implementations are described in more detail below.

Linear-Leak Integrate and Fire (LL-IF)

Figure 3A:
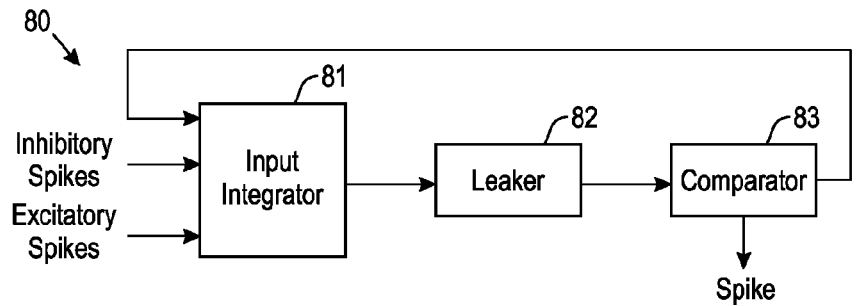
FIG. 3A shows a block diagram of a linear-leak integrate and fire (LL-IF) electronic neuron, in accordance with an embodiment of the invention.

A first implementation of the invention comprises a linear-leak integrate and fire (LL-IF) electronic neuron 80 as shown by an example block diagram in FIG. 3A. For each excitatory spike received by the LL-IF neuron 80, an input integrator module 81 increases a membrane potential V of the neuron by a certain amount $s_+$, while for each inhibitory spike the neuron receives the input integrator module 81 decreases V by a certain amount $s_-$. The neuron membrane leak is simulated by linearly decreasing V by λ in each time step utilizing a leaker module 82. A digital clock signal provides time steps. According to a comparator module 83, if input to the neuron 80 increases V above a threshold θ, a spike is generated and V is set to a reset value $V_{reset}$.

The neuron parameters are non-negative integers, wherein $n_+$ is the number of excitatory spikes received in a time step (an integer [0, 63]), $n_-$ is the number of inhibitory spikes received in a time step (an integer [0, 63]), $s_+$ is the excitation strength $\epsilon$ {0,1,2,4,8,16,32}, $s_-$ is the inhibition strength $\epsilon$ {0,1,2,4,8,16,32} such that for efficiency $s_+$ and $s_-$ have been restricted to be powers of 2, θ is the spiking threshold which is an integer with the same resolution as V, $V_{reset}$ is the reset voltage (for simplicity its is assumed $V_{reset}=0$), and λ is the leak rate (an integer [0, 63]).

In terms of neuron dynamics, V is the membrane voltage (a non-negative integer represented in 8 bits) maintained by a digital counter, wherein V does not wrap around such that if V is already zero, V−1 is still zero. Update rule for V involves updating V according to:

$$V(t)=V(t-1)-\lambda+s_+n_+-s_-n_-$$

wherein $s_+$ is a power of 2 such that $+s_+n_+$ is a bit-shifted addition of $n_+$. Further, $s_-$ is a power of 2 such that $-s_-n_-$ is a bit-shifted subtraction of $n_-$.

A spike condition for the neuron comprises:

If $V(t) \geqq \theta$, then set $V(t)=V_{reset}$ and emit a spike.

Figure 2A:
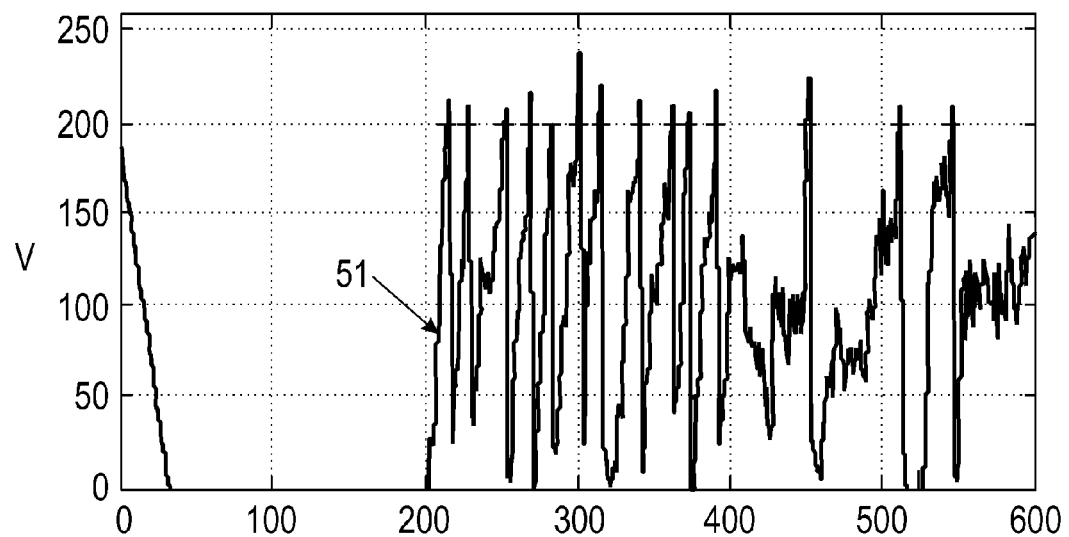
FIG. 2A shows an example response graph of a Linear-Leak Integrate and Fire electronic neuron, in accordance with an embodiment of the invention.

FIG. 2A shows an example response graph 51 of the V variable of a LL-IF electronic neuron in time to the following conditions: no input (0-200 time steps), stochastic excitatory input (201-400 time steps) and stochastic excitatory and inhibitory input (401-600 time steps). The number of input spikes in each time step was drawn from a Gaussian distribution (μ=1, δ=1), with negative numbers rounded to zero. The length of each time step is determined by the digital clock signal. A time step of 1 msec will produce behavior on a time scale approximating that found in biological neurons. Parameter values used are: $s_+=2^4$, $s_-=2^3$, θ=200, $V_{reset}=0$, λ=6.

Convex-Decay Integrate and Fire with Refractory Period (CD-IF w/RP)

Figure 3B:
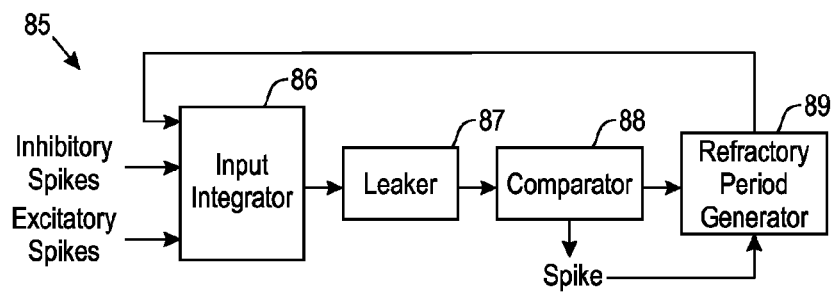
FIG. 3B shows a block diagram of a convex-decay approximation integrate and fire with refractory period (CD-IF w/RP) electronic neuron, in accordance with an embodiment of the invention.

A second implementation of the invention comprises a convex-decay approximation integrate and fire with refractory period (CD-IF w/RP) electronic neuron 85 as shown by an example block diagram in FIG. 3B. The CD-IF w/RP electronic neuron 85 has a refractory period wherein for each excitatory spike the neuron receives in an input integrator 86 increases the membrane potential V by a certain amount $s_+$ while for each inhibitory spike the neuron receives the input integrator 86 decreases V by a certain amount $s_-$. The neuron membrane leak is simulated by a leaker module 87 decaying V according to a time constant τ in each time step (thus assuming that the resting membrane potential is 0). According to a comparator module 88, if input to the neuron increases V above a threshold θ, the neuron generates a spike and V is set to $V_{reset}$. Once the neuron has spiked, a refractory period is simulated by a refractory period generator module 89 holding V at $V_{reset}$ for ρ time steps.

All neuron parameters are non-negative integers, wherein $n_+$ is the number of excitatory spikes received in a time step (an integer [0, 63]), $n_-$ is the number of inhibitory spikes received in a time step (an integer [0, 63]), $s_+$ is the excitation strength $\epsilon$ {0,1,2,4,8,16,32,64,128}, $s_-$ is the inhibition strength $\epsilon$ {0,1,2,4,8,16,32,64,128} such that for efficiency $s_+$ and $s_-$ have been restricted to be powers of 2, θ is the spiking threshold (an integer with the same resolution as V), $V_{reset}$ is the reset voltage and may be any positive integer less than θ, τ is membrane time constant $\epsilon$ {1,2,4,8 ... $2^{10}$} such that for efficiency τ has been restricted to be a power of 2 within the range of V, and ρ is the refractory period (an integer [0, 63]). The parameter ranges provided herein are exemplars only. Those skilled in the art will recognize that parameter ranges are possible and useful with embodiments of the present invention.

In terms of neuron dynamics, V is the membrane potential counter (a non-negative integer represented in 10 bits) wherein V does not wrap around such that if V is already zero, V−1 is still zero. r is a refractory period counter (a positive integer represented in 6 bits) wherein r does not wrap around.

An update rule comprises:

If r(t)>0 then r(t)=r(t−1)−1 and do not update V, else update V according to $$V_{(t)} = V_{(t-1)} - \left(\frac{V_{(t-1)}}{\tau} + 1\right) + s_+ n_+ - s_- n_-$$

wherein $s_+$ is a power of 2 such that $+s_+n_+$ is a bit-shifted addition of $n_+$. Further, $s_-$ is a power of 2, $-s_-n_-$ is a bit-shifted subtraction of $n_-$. Further, τ is a power of 2 such that $-V(t-1)$ τ is a bit-shifted subtraction of V(t−1).

A spike condition for the neuron comprises:

If $V(t) \geqq \theta$, then set r(t)=ρ and emit a spike.

Figure 2B:
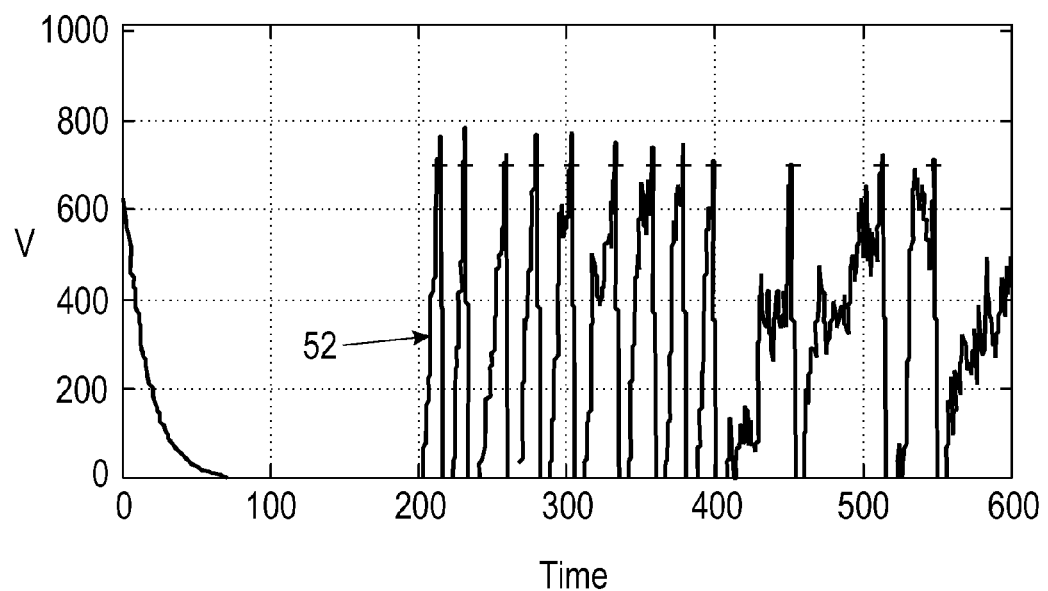
FIG. 2B shows an example response graph of a Convex-Decay Integrate and Fire with Refractory Period electronic neuron, in accordance with an embodiment of the invention.

FIG. 2B shows an example response graph 52 of a CD-IF w/RP electronic neuron to: no input (e.g., 0-200 time steps), stochastic excitatory input (e.g., 201-400 time steps) and stochastic excitatory and inhibitory input (e.g., 401-600 time steps). The number of input spikes in each time step was drawn from a Gaussian distribution (μ=1, δ=1), with negative numbers rounded to zero. Parameter values used are: $s_+=2^6$, $s_-=2^5$, θ=700, $V_{reset}=0$, ρ=8 and τ=16.

Convex-Decay Integrate and Fire with Refractory Period and Conductance-Based Inhibition (CD-IF w/RP & CB-I)

Figure 3C:
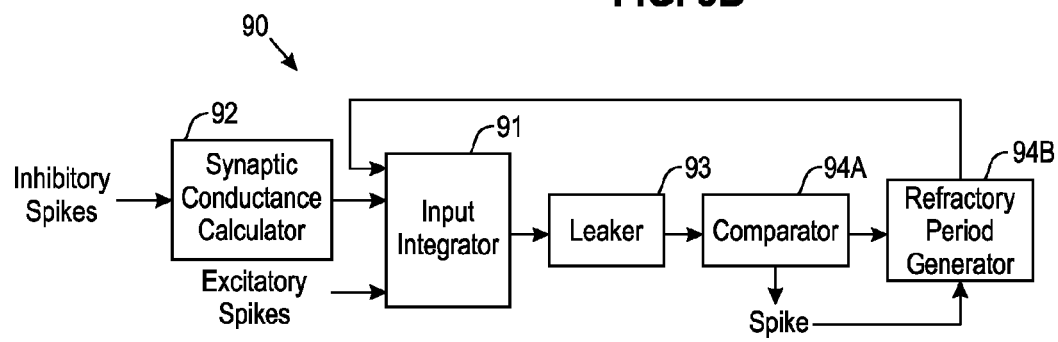
FIG. 3C shows a block diagram of a refractory period and conductance-based inhibition (CD-IF w/RP & CB-I) electronic neuron, in accordance with an embodiment of the invention.

A third implementation of the invention comprises a convex-decay approximation integrate and fire with a refractory period and conductance-based inhibition (CD-IF w/RP & CB-I) electronic neuron 90 as shown by an example block diagram in FIG. 3C. For each excitatory spike the CD-IF w/RP & CB-I neuron 90 receives, an input integrator module 91 increases the membrane potential V by a certain amount $s_+$, and for each inhibitory spike received by the input integrator module 91, the input integrator module 91 increases inhibitory channel conductance g by a certain amount $s_-$. A synaptic conductance calculator module 92 provides inhibitory channel conductance decay in each time step with a rate governed by a time constant $\tau_g$. Inhibition is then integrated into the membrane potential by the input integrator module 91 in each time step by decreasing the membrane potential V as:

$$\frac{V}{2^{g_{scale} - floor(\log_2 g)}}$$

wherein $g_{scale}$ is a scaling factor of g (this assumes an inhibitory reversal potential of 0). The membrane leak is simulated by a leaker module 93 decaying V according to a time constant $\tau$ in each time step (thus assuming that the resting membrane potential is 0). According to a comparator module 94A, if input to the neuron increases V above a threshold $\theta$, the neuron generates a spike and V is set to $V_{reset}$. According to a refractory period generator module 94B, once the neuron has spiked, a refractory period is simulated by holding V at $V_{reset}$ for $\rho$ time steps.

All parameters are non-negative integers, wherein $n_+$ is the number of excitatory spikes received in a time step (an integer [0, 63]), $n_-$ is the number of inhibitory spikes received in a time step (an integer [0, 63]), $s_+$ is the excitation strength $\epsilon$ $\{0,1,2,4,8,16,32,64,128\}$, $s_-$ is the inhibition strength $\epsilon$ $\{0,1,2,4,8,16,32,64,128\}$ such that for efficiency $s_+$ and $s_-$ have been restricted to be powers of 2, $\theta$ is the spiking threshold (an integer with the same resolution as V), $V_{reset}$ is the reset voltage and may be any positive integer less than $\theta$, $\tau$ is membrane time constant $\epsilon$ $\{1,2,4,8\ldots 2^{10}\}$ such that for efficiency $\tau$ has been restricted to be a power of 2 within the range of V, $\tau_g$ is the inhibitory conductance time constant $\epsilon$ $\{1,2,4,8\ldots 2^8\}$ such that for efficiency $\tau_g$ has been restricted to be a power of 2 within the range of g, $\rho$ is the refractory period (an integer [0, 63]), and $g_{scale}$ is divisive scaling factor of g (an integer [10, 16]). The parameter ranges provided herein are exemplars only. Those skilled in the art will recognize that parameter ranges are possible and useful with embodiments of the present invention.

In terms of dynamics, V is the membrane voltage counter (a non-negative integer represented in 10 bits), wherein V does not wrap around such that if V is already zero, V-1 is still zero. r is a refractory period counter (a positive integer represented in 6 bits) wherein r does not wrap around. g is the inhibitory conductance (a positive integer represented in 10 bits) wherein g does not wrap around.

An update rule for the neuron comprises:

$$g(t) = g(t-1) - \left(\frac{g(t-1)}{\tau_g} + 1\right) + n_- s_-$$

wherein $\tau_g$ is a power of 2, $-g(t-1)/\tau_g$ is a bit-shifted subtraction of g(t-1), $s_-$ is a power of 2, $-s_- n_-$ is a bit-shifted subtraction of $n_-$.

If r(t)>0 then r(t)=r(t-1)-1 and do not update V,
else update V according to:

$$V_{(t)} = V_{(t-1)} - \left(\frac{V_{(t-1)}}{\tau} + 1\right) + s_+ n_+ - \left(\frac{V_{(t-1)}}{2^k}\right)$$

wherein $k = g_{scale} - floor(\log_2(g(t)))$, and floor $(\log_2(x))$ is the position of the most significant non-zero bit in x, k is an integer, and $(V(t-1)/2^k)$ is a bit-shifted version of V(t-1). Further, $s_+$ is a power of 2 such that $+s_+ n_+$ is a bit-shifted addition of $n_+$. Further, $\tau$ is a power of 2 such that $-V(t-1)/\tau$ is a bit-shifted subtraction of V(t-1).

A spike condition for the neuron comprises:
If $V(t) \geq \theta$, then set r(t)=$\rho$ and emit a spike.

Figure 2C:
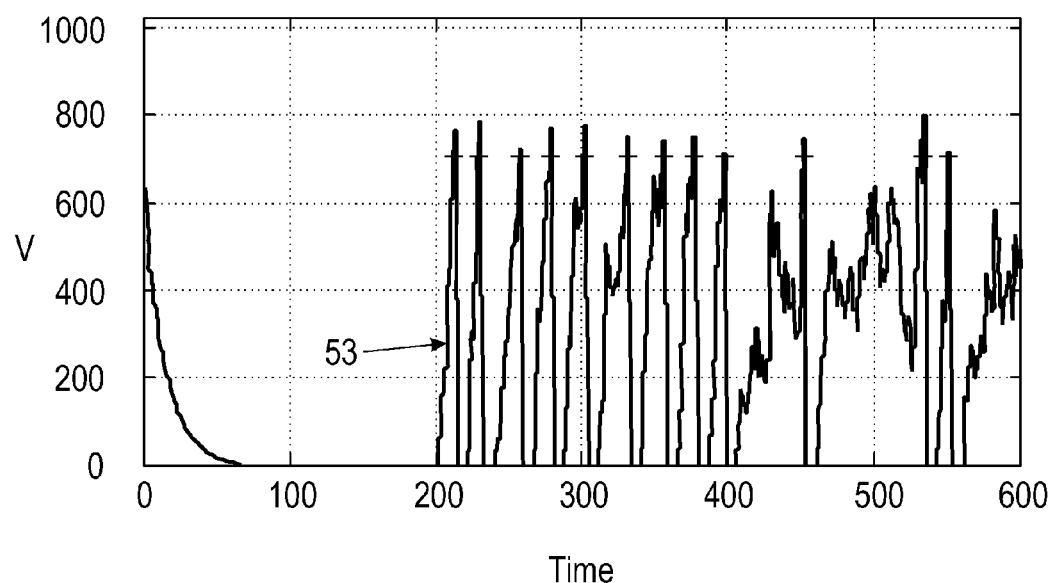
FIG. 2C shows an example response graph of a Convex-Decay Integrate and Fire with Refractory Period and Conductance-Based Inhibition electronic neuron, in accordance with an embodiment of the invention.
Figure 4:
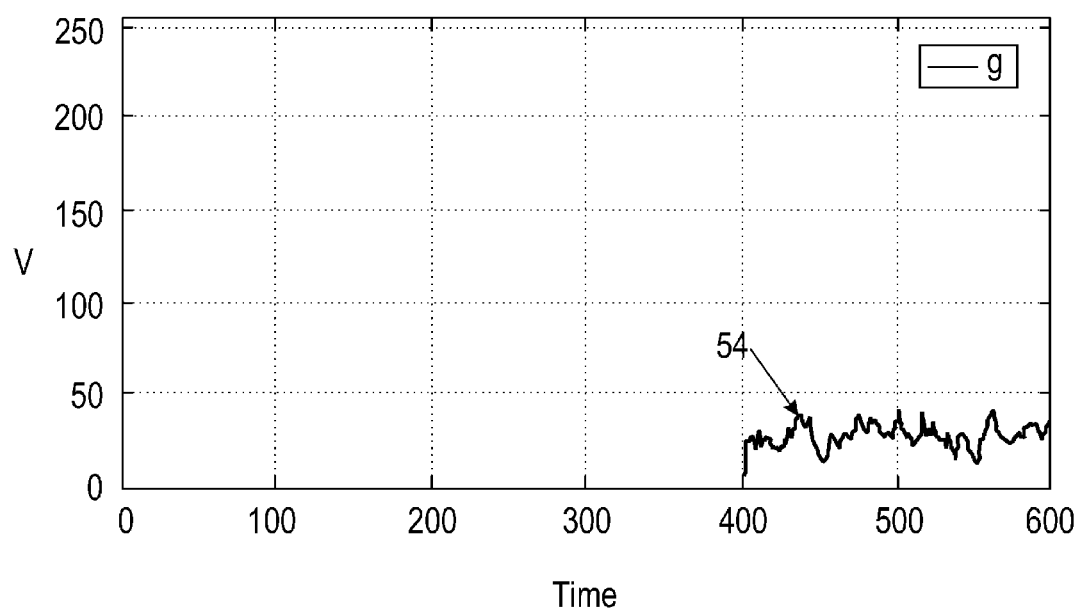
FIG. 4 shows example graph of values for inhibitory conductance in response to the same stimulation train as in FIG. 2C, in accordance with an embodiment of the invention.

FIG. 2C shows an example response graph 53 of a CD-IF w/RP & CB-I electronic neuron: no input (0-200 time steps), stochastic excitatory input (201-400 time steps) and stochastic excitatory and inhibitory input (401-600 time steps). The number of input spikes in each time step was drawn from a Gaussian distribution ($\mu$=1, $\delta$=1), with negative numbers rounded to zero. Parameter values used are: $s_+=2^6$, $s_-=2^5$, $\theta$=700, $V_{reset}$=0, $\rho$=8 and $\tau_g$=8, $g_{scale}$=8. FIG. 4 shows example graph 54 of values for inhibitory conductance g in response to same stimulation train as in FIG. 2C.

Convex-Decay Integrate and Fire with Refractory Period and Conductance-Based Synapses (CD-IF w/RP & CB-S)

Figure 3D:
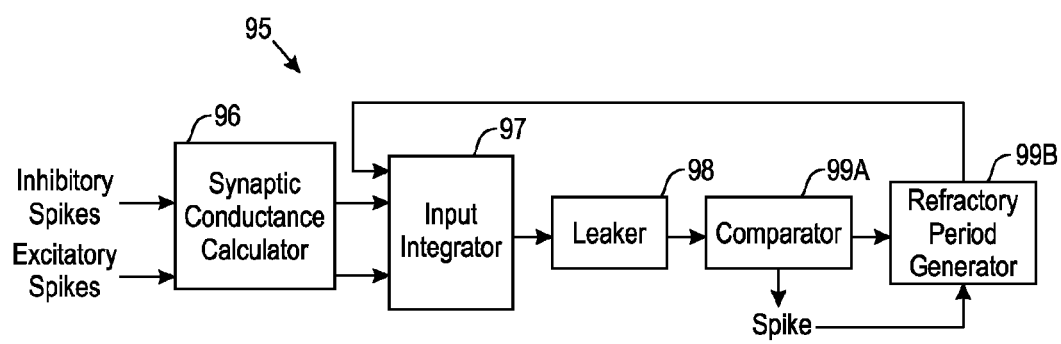
FIG. 3D shows a block diagram of a refractory period and conductance-based synapses (CD-IF w/RP & CB-S) electronic neuron, in accordance with an embodiment of the invention.

A fourth implementation of the invention comprises a convex-decay approximation integrate and fire with a refractory period and conductance-based synapses (CD-IF w/RP & CB-S) electronic neuron 95 as shown by an example block diagram in FIG. 3D. Synaptic channel conductance is modeled as a difference of exponential conductance variables $g_1$ and $g_2$, which are increased by a strength factor s with each input to the neuron. According to a synaptic conductance calculator module 96, conductance variables then decay in each time step with a rate governed by a time constant $\tau_g$. In each time step, the neuron membrane potential V is changed by an input integrator module 97 using the synaptic current:

$$\frac{E_{rev} - V}{2^{g_{scale} - floor(\log_2(g_1 - g_2))}}$$

wherein $g_{scale}$ is a scaling factor of g and $E_{rev}$ is the channel reversal potential, assumed to be 0 for the inhibitory channel and $2^{10} + 2^{EEshift}$ for the excitatory channel. The membrane leak is simulated by a leaker module 98 decaying V according to a time constant $\tau$ in each time step (thus assuming that the resting membrane potential is 0). According to a comparator module 99A, if input to the neuron 95 increases V above a threshold $\theta$, the neuron generates a spike and V is set to $V_{reset}$. According to a refractory period generator 99B, once the neuron has spiked, a refractory period is simulated by holding V at $V_{reset}$ for $\rho$ time steps.

All parameters are non-negative integers, wherein $n_+$ is the number of excitatory spikes received (an integer [0, 63]), $n_-$ is the number of inhibitory spikes received (an integer [0, 63]), $s_+$ is the excitation strength $\epsilon$ $\{0,1,2,4,8,16,32,64,128\}$, $s_-$ is the inhibition strength $\epsilon$ $\{0,1,2,4,8,16,32,64,128\}$ such that for efficiency $s_+$ and $s_-$ have been restricted to be powers of 2, $\theta$ is the spiking threshold (an integer with the same resolution as V), $V_{reset}$ is the reset voltage and may be any positive integer less than $\theta$, $\tau$ is membrane time constant $\epsilon$ $\{1,2,4,8\ldots 2^{10}\}$ such that for efficiency $\tau$ has been restricted to be a power of 2 within the range of V, $\tau_{gI1}$ is a first inhibitory conductance time constant $\epsilon$ $\{1,2,4,8\ldots 2^8\}$, $\tau_{gI2}$ is a second inhibitory conductance time constant $\epsilon$ $\{1,2,4,8\ldots 2^8\}$, $\tau_{gE1}$ is a first excitatory conductance time constant ∈ {1,2,4,8 ... $2^8$}, $\tau_{gE2}$ is a second excitatory conductance time constant ∈ {1,2,4,8 ... $2^8$} such that for efficiency all $\tau_g$ have been restricted to be a power of 2 within the range of g, ρ is the refractory period (an integer [0, 63]), $g_{Escale}$ is a divisive scaling factor on excitatory conductance (an integer [10, 16]), $g_{Iscale}$ is a divisive scaling factor on inhibitory conductance (an integer [10, 16]), and $E_{EShift}$ adjusts for excitatory reversal potential being larger than threshold (an integer [10, 13]). The parameter ranges provided herein are exemplars only. Those skilled in the art will recognize that parameter ranges are possible and useful with embodiments of the present invention.

In terms of dynamics, V is the membrane voltage (a non-negative integer represented in 10 bits), wherein V does not wrap around such that if V is already zero, V−1 is still zero. r is a refractory period counter (a positive integer represented in 6 bits) wherein r does not wrap around. $g_{I1}$ is inhibitory exponential variable one (a positive integer represented in 10 bits). $g_{I2}$ is inhibitory exponential variable two (a positive integer represented in 10 bits). $g_{E1}$ is excitatory exponential variable one (a positive integer represented in 10 bits). $g_{E2}$ is excitatory exponential variable two (a positive integer represented in 10 bits). All g values do not wrap around.

Update rules for the neuron comprise:
Update $g_{I1}$ according to:

$$g_{I1}(t) = g_{I1}(t-1) - \left(\frac{g_{I1}(t-1)}{\tau_{gI1}} + 1\right) + n_- s_-$$

Update $g_{I1}$ according to:

$$g_{I2}(t) = g_{I2}(t-1) - \left(\frac{g_{I2}(t-1)}{\tau_{gI2}} + 1\right) + n_- s_-$$

Update $g_{E1}$ according to:

$$g_{E1}(t) = g_{E1}(t-1) - \left(\frac{g_{E1}(t-1)}{\tau_{gE1}} + 1\right) + n_+ s_+$$

Update $g_{E2}$ according to:

$$g_{E2}(t) = g_{E2}(t-1) - \left(\frac{g_{E2}(t-1)}{\tau_{gE2}} + 1\right) + n_+ s_+$$

wherein $\tau_g$ is a power of 2, $-g(t-1)/\tau_g$ is a bit-shifted subtraction of g(t−1), $s_-$ is a power of 2, $-s_- n_-$ is a bit-shifted subtraction of $n_-$, $s_+$ is a power of 2, $+s_+ n_+$ is a bit-shifted addition of $n_+$.

If r(t)>0 then r(t)=r(t−1)−1 and do not update V, else update V according to:

$$V(t) = V(t-1) - \left(\frac{V(t-1)}{\tau} + 1\right) + \left(\frac{2^{10} - V + 2^{EShift}}{2^{k_s}}\right) - \left(\frac{V(t-1)}{2^{k_I}}\right)$$

wherein $k_I = g_{Iscale}$−floor ($\log_2(g_{I1} - g_{I2})$), $k_E = g_{Escale}$−floor ($\log_2(g_{E1} - g_{E2})$), k is an integer, $x/2^k$ is a bit-shifted version of x, floor($\log_2(x)$) is the position of the most significant non-zero bit in x, $2^{10}$−V is the bitwise complement of V, and $2^{10}$−V+$E_{EShift}$ is a bit-shifted version of $2^{10}$−V. Further, τ is a power of 2 such that −V(t−1)/τ is a bit-shifted subtraction of V(t−1).

A spike condition for the neuron comprises:
If V(t)≧θ, then set r(t)=ρ and emit a spike.

Figure 5:
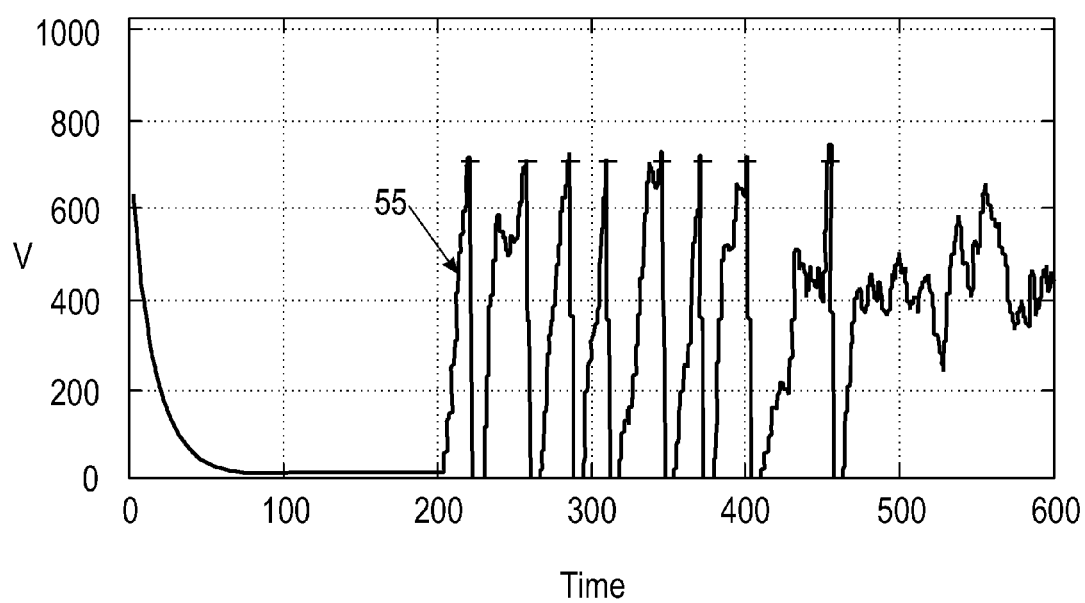
FIG. 5 shows an example response graph of a Convex-Decay Integrate and Fire with Refractory Period and Conductance-Based Synapses electronic neuron, in accordance with an embodiment of the invention.

FIG. 5 shows an example response graph 55 of a CD-IF w/RP & CB-S electronic neuron: no input (0-200 time steps), stochastic excitatory input (201-400 time steps) and stochastic excitatory and inhibitory input (401-600 time steps). The number of input spikes in each time step was drawn from a Gaussian distribution (μ=1, δ=1), with negative numbers rounded to zero. Parameter values used are: $s_+$=$2^6$, $s_-$=$2^5$, θ=700, $V_{reset}$=0, ρ=8, τ=16, $\tau_{gI1}$=2, $\tau_{gI2}$=8, $\tau_{gE1}$=1, $\tau_{gI2}$=2, $g_{Iscale}$=10, $g_{Escale}$=12, $E_{EShift}$=12, $g_{scale}$=8.

Figure 6A:
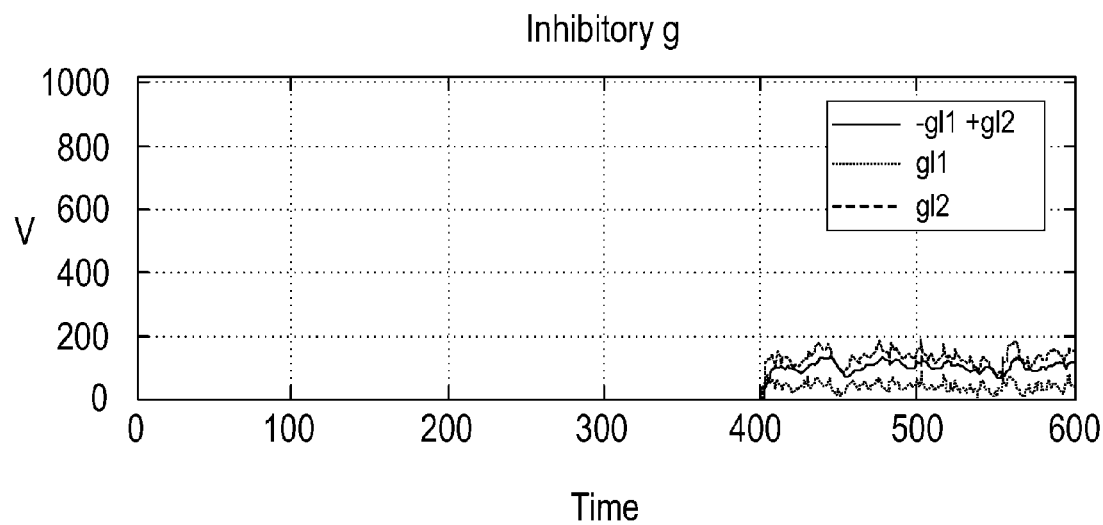
FIG. 6A shows example graphs of values for inhibitory conductance in response to the same stimulation train as in FIG. 5, in accordance with an embodiment of the invention.
Figure 6B:
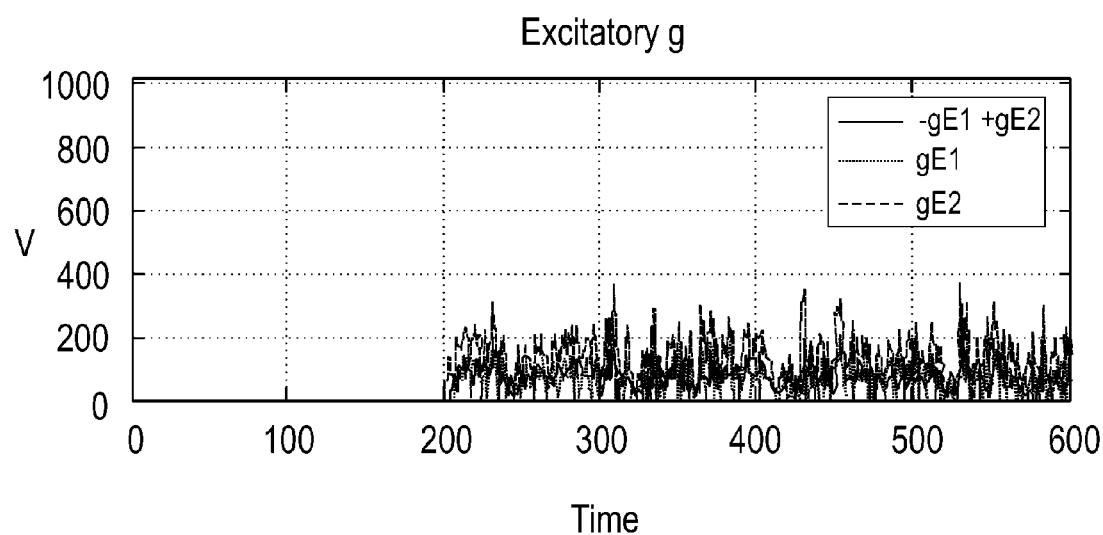
FIG. 6B shows example graphs of values for excitatory conductance in response to the same stimulation train as in FIG. 5, in accordance with an embodiment of the invention.

FIG. 6A shows example graphs of values for inhibitory conductance g in response to same stimulation train as in FIG. 5. FIG. 6B shows example graphs of values for excitatory g in response to the same stimulation train as in FIG. 5.

In the example implementations of the invention described herein, the excitation and inhibition strength parameters $s_+$ and $s_-$ are restricted to powers of 2. This restriction allows the electronic neurons to efficiently integrate input spikes by multiplying the number of excitatory and inhibitory spikes received in each time step $n_+$ and $n_-$ by their respective strength parameter using a simple bit shift operation. Through addition or subtraction, the resulting value can then be integrated into the voltage or synaptic conductance, as appropriate for the electronic neuron.

There may be cases when finer control over the synaptic strength parameters is desirable than is afforded by restricting them to powers of 2. Such control can be achieved by allowing the synaptic strength parameters to be any positive integer within a given range (e.g., [0, 127]), providing further flexibility. Excitatory spikes can then be integrated by adding $s_+$ to the appropriate variable, $n_+$ number of times, while inhibitory spikes can be integrated by subtracting $s_-$ from the appropriate variable, $n_-$ number of times. If an electronic neuron receives at most one excitatory and one inhibitory input spike per time step, this implementation is as efficient as the implementations described further above.

The CD-IF neuron membrane potential update rule:

$$V_{(t)} = V_{(t-1)} - \left(\frac{V_{(t-1)}}{\tau} + 1\right) + s_+ n_+ - s_- n_-$$

for the second and third implementations above provides a convex approximation to the exponential decay of membrane voltages used in traditional integrate and fire (IF) neuron models and, therefore, a greater degree of biological realism compared to the corresponding membrane update rule:

$$V(t) = V(t-1) - \lambda + s_+ n_+ - s_- n_-$$

for the first embodiment of the invention, which utilizes a constant linear ramp down in membrane voltage over time.

A mixed membrane update rule may be utilized as:

$$V_{(t)} = V_{(t-1)} - \left(\frac{V_{(t-1)}}{\tau} + \lambda\right) + s_+ n_+ - s_- n_-$$

wherein using both a voltage dependent divisive leak and a voltage independent linear leak term, this mixed membrane update rule provides further tunability.

According to an embodiment of the invention, parameter values may be selected for which a neuromorphic and synaptronic system implementing the mixed membrane update rule replicates the behavior of the first, second and third implementations of the invention described above.

Event-based neuron updates may also be utilized. The update rules described herein provide updates of an electronic neuron in a digital clock driven fashion, with one or more state variables changing in each time step. The neurons may be simulated in an event-based fashion such that state variables only change when an event occurs. This can be achieved by keeping a counter, K, for each neuron, which is set to zero each time an event occurs and increments by 1 in each time step. The state variable processes then change each time an event occurs according to this counter. For example, the processes for the first implementation of the invention changes to the following:

Update Rule:
update V according to: $V=V-K\lambda+s_+n_+-s_-n_-$
because $s_+$ is a power of 2, $+s_+n_+$ is just bit shifted addition of $n_+$
because $s_-$ is a power of 2, $-s_-n_-$ is just bit shifted subtraction of $n_-$
Spike Condition:
IF $V(t) \geq \theta$
set $V(t)=V_{reset}$ and emit spike.

As such, embodiments of the invention facilitate biological brain simulations using dedicated digital electronic neurons, which are less susceptible to small hardware variations that occur during fabrication.

Embodiments of the present invention further provide mixed-mode, digital-analog, integrate and fire electronic neurons with fully asynchronous, power-efficient neuromorphic and synaptronic hardware implementation.

Figure 7A:
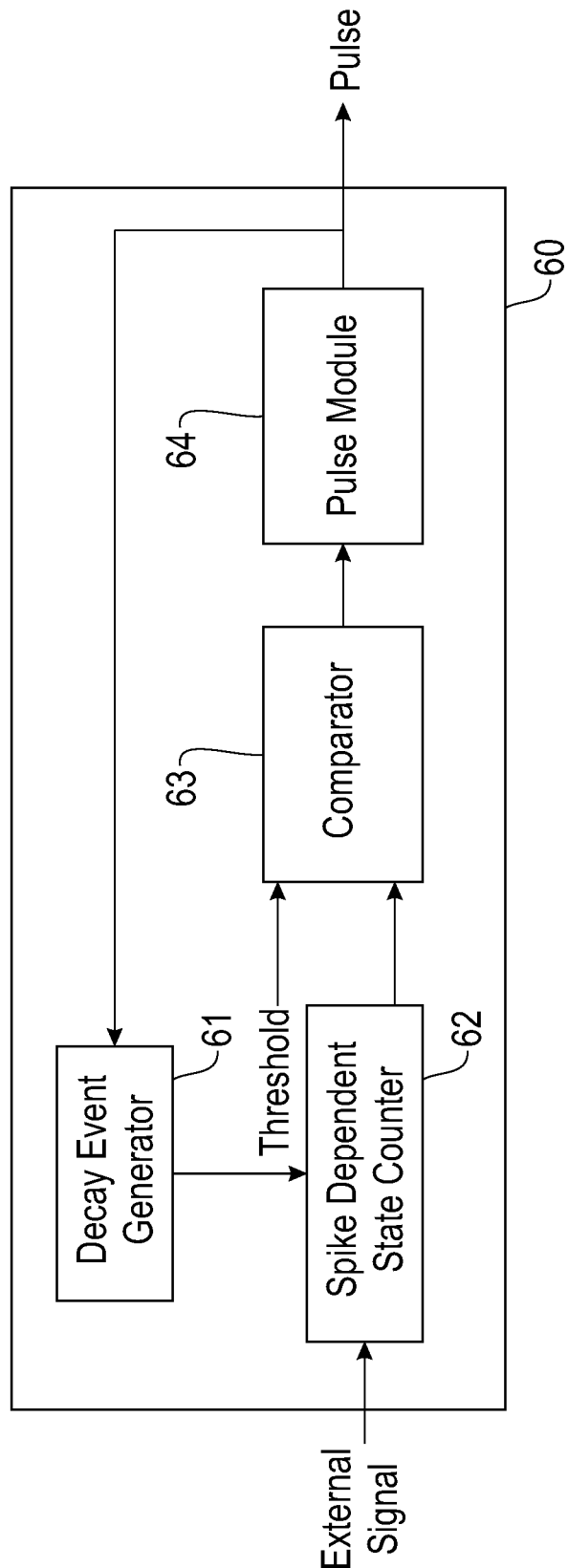
FIG. 7A shows a diagram of a mixed-mode digital-analog, integrate and fire electronic neuron, in accordance with an embodiment of the invention.

FIG. 7A shows a diagram of an example implementation of a mixed-mode digital-analog, integrate and fire electronic neuron 60, according to the invention. The mixed-mode neuron maintains its membrane potential (state) in a digital state counter 62. When the neuron receives an external signal comprising a spike from an excitatory neuron, the state counter 62 is incremented by a small integer (typically set to 1). When the neuron receives an external signal comprising a spike from an inhibitory neuron the state counter 62 is decremented by a small integer (typically set to 1). The increments and decrements are carried out in a power-efficient bit-wise fashion so that only those bits in the state counter 62 that need to change are modified. If the state counter exceeds a threshold as determined by a comparator 63, then the neuron fires and emits a spike via a pulse module 64.

Figure 7B:
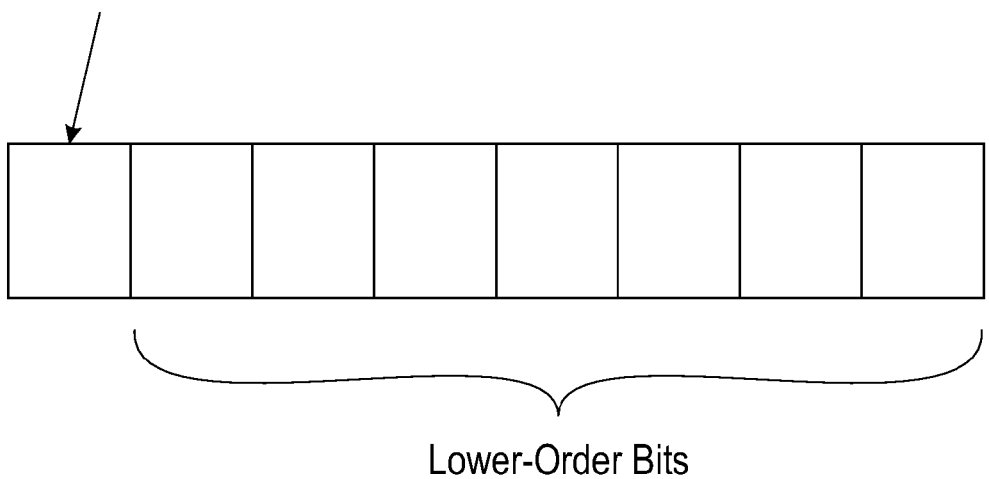
FIG. 7B shows a diagram of a digital counter for the electronic neuron of FIG. 7A, in accordance with an embodiment of the invention.

The MSB (most significant bit) and the lower-order bits (all but the MSB bit) of the state counter 62 are identified in FIG. 7B. A mechanism 61 is provided for generating decay events (FIG. 7A). An efficient state counter leak can be achieved by implementing the following when a decay event occurs:
If MSB of state counter is one,
    MSB of state counter is set to zero
Else
    All lower-order bits are set to zero
Endif.

Figure 8:
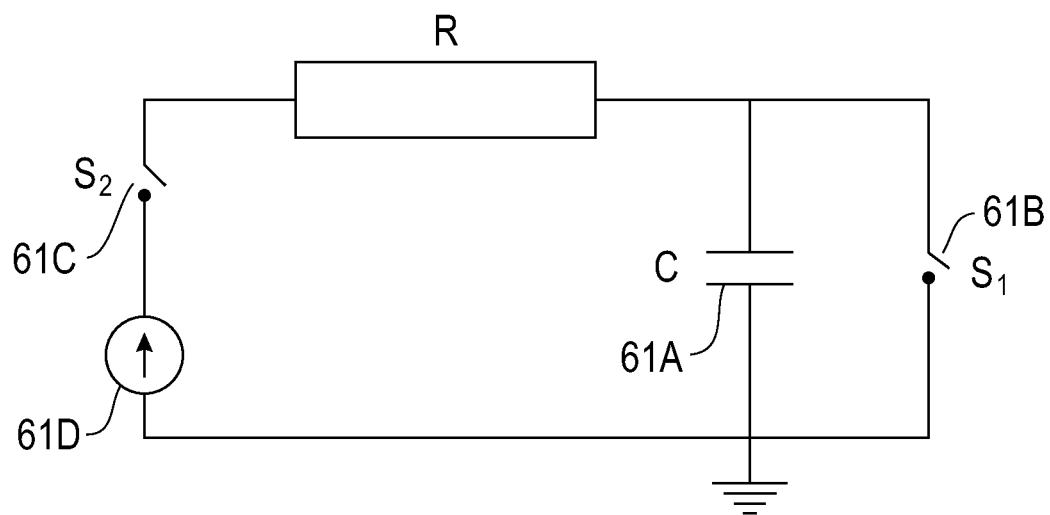
FIG. 8 shows a mechanism for generating decay events in the electronic neuron of FIG. 7A, in accordance with an embodiment of the invention.

Referring to FIG. 8, in a first embodiment, the mechanism 61 for generating decay events comprises an analog resistor-capacitor (RC) circuit with an RC time constant of a few milliseconds (e.g., values in the range of about 5-20 msec would allow the electronic neurons to reproduce behavior observed in biological neurons). When the electronic neuron 60 spikes, a capacitor C is quickly discharged.

Figure 9:
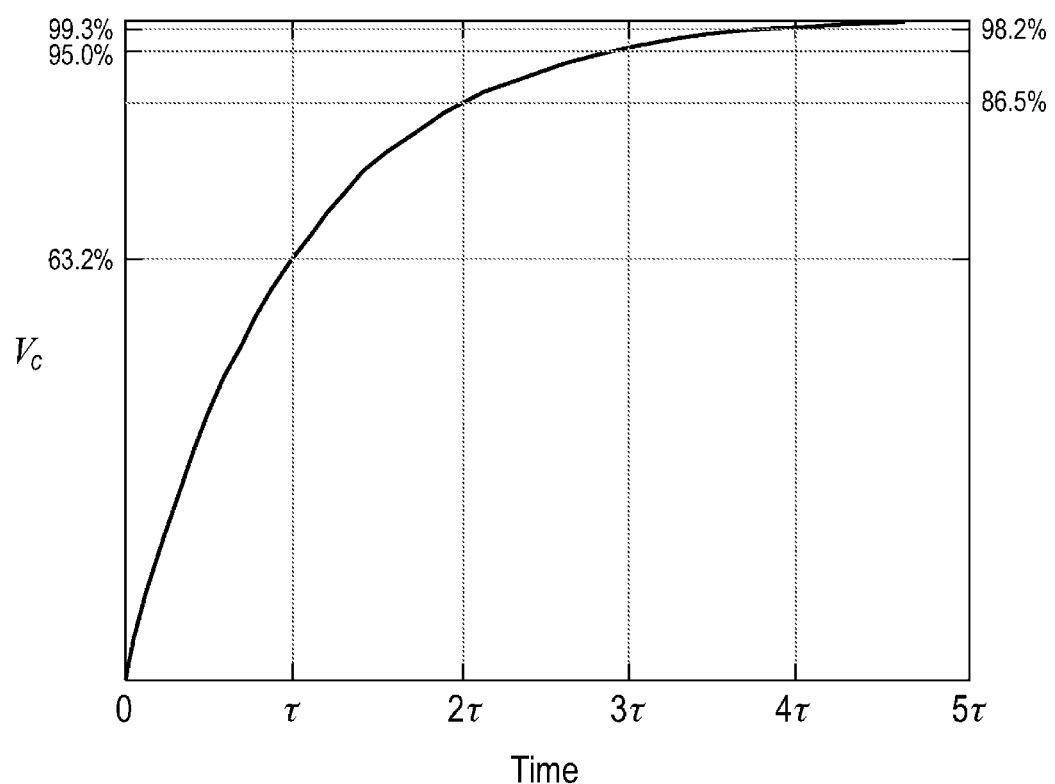
FIG. 9 shows a charge rate graph for the mechanism in FIG. 8, in accordance with an embodiment of the invention.

The capacitor C then slowly charges as shown by example in FIG. 9. When the capacitor C reaches a threshold value (e.g., 86.5% of its full charge), a decay event occurs and the following operations are executed in the circuit 61:
Capacitor 61A is quickly discharged via a switch 61B, and starts charging again via a switch 61C from a current source 61D.
If MSB of state counter 62 is one,
    MSB of the state counter is set to zero
Else
    All lower-order bits are set to zero
Endif.

Figure 10:
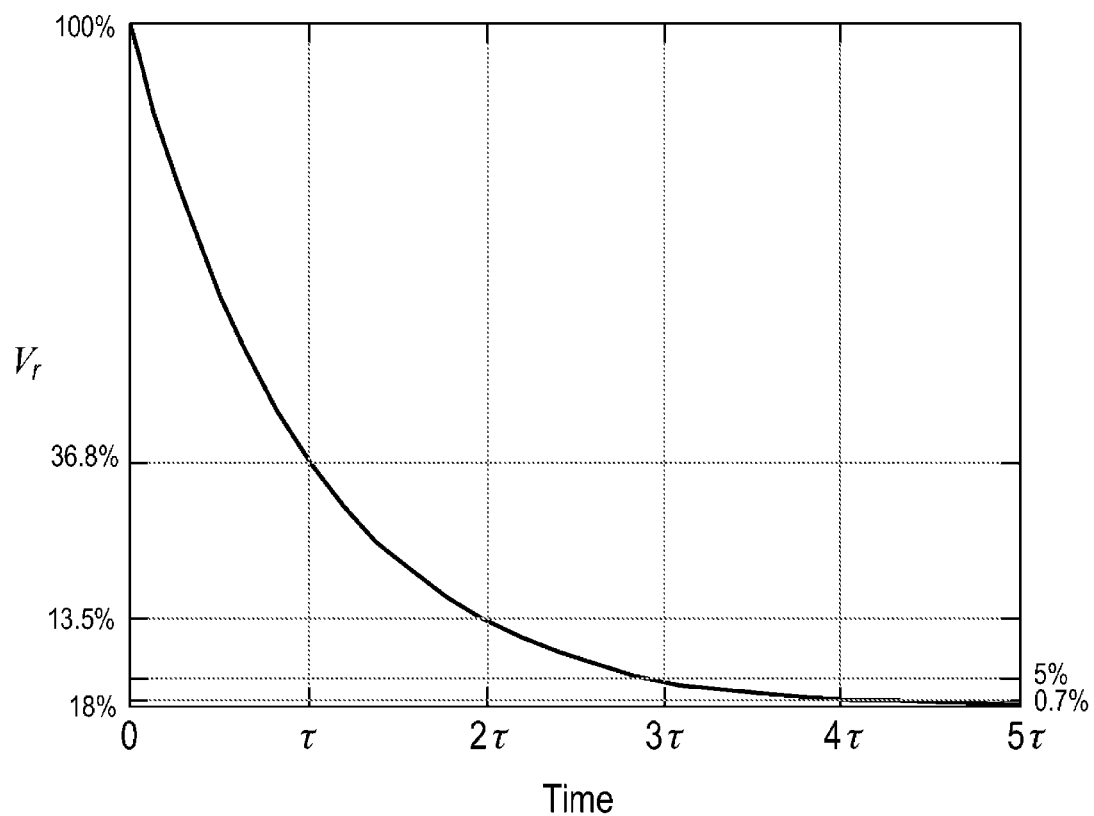
FIG. 10 shows a discharge rate graph for the mechanism in FIG. 8, in accordance with an embodiment of the invention.

In a second embodiment, the mechanism 61 for generating decay events comprises an RC circuit (such as shown by example in FIG. 8) with an RC time constant of a few milliseconds (e.g., values in the range of about 5-20 msec would allow the electronic neurons to reproduce behavior observed in biological neurons). When the electronic neuron 60 spikes, the capacitor C is quickly discharged. Further, the following operations are executed:
STEP1: The capacitor C slowly charges from a starting value (FIG. 9). If a spike event just occurred, the starting value is zero, otherwise the starting value is the charge the capacitor C already has. When the capacitor C reaches a first threshold value (e.g., 86.5% of its full charge), a decay event occurs and the following are executed:
If MSB of state counter 62 (FIG. 7A) is one,
    MSB of the state counter 62 is set to zero,
Else
    All lower-order bits of the state counter 62 are set to zero,
Endif.
Go to STEP 2.
STEP 2: The capacitor C then slowly discharges as shown in FIG. 10, starting from the charge that it already has. When the capacitor C reaches a second threshold value (e.g., about 13.5% or 14.5% of its full charge), a decay event occurs and the following operations are executed:
If MSB of state counter 62 (FIG. 7A) is one,
    MSB of state counter 62 is set to zero,
Else
    All lower-order bits of the state counter 62 are set to zero,
Endif.
Go to STEP 1. The charging in STEP 1 will now not be from an empty capacitor, but starting from the charge that the capacitor already has.
In percentage terms, preferably:
first threshold value+second threshold value=100%.

STEP 1 and STEP 2 above are reverse of each other, while in STEP 1 energy (i.e., electrical charge) is fed into the capacitor C, in STEP 2 energy is extracted from the capacitor C. As such, any net energy loss is reduced.

The state counter 62 continues the operations of incrementing when the electronic neuron 60 receives excitatory signals and decrementing when the neuron receives inhibitory signals. If at any time, the state counter 62 reaches a threshold value (e.g., about 255), the electronic neuron 60 fires and emits a spike signal. When the electronic neuron 90 spikes, the capacitor C is quickly discharged.

In the above examples, when a spike event occurs the capacitor C is discharged. To avoid energy loss, the discharging operation can be eliminated. This provides additional heterogeneity and a source of randomness in neuron firing.

Alternatively, two capacitors may be utilized in an RLC circuit comprising a resistor, an inductor, and said capacitors. The neuron starts with both capacitors in discharged state. At first, the first capacitor is charged until it reaches a threshold value via a current source, in the meanwhile the second capacitor discharges via the inductor into the current source. When the first capacitor reaches a threshold value, the roles of the two capacitors are reversed. Now, the second capacitor is charged until it reaches a threshold value via a current source, in the meanwhile the first capacitor discharges via an inductor into the current source. When the second capacitor reaches a threshold value, the roles of the two capacitors are again reversed. In this manner, the cycle continues. Thus, by alternating between the two capacitors, the loss of energy is minimized.

Embodiments of the mixed-mode electronic neuron according to the invention provide asynchronous operation among several such neurons, and are efficient in reducing energy consumption for the decay capacitor (loss of energy in the capacitor occurs only when a spike event occurs and even this can be minimized if necessary). The mixed-mode neurons require minimal energy in operating the state counter (loss of energy for the state counter occurs only when new information arrives or when a decay event takes place or when a spike event takes place). There is natural heterogeneity across neurons. The neurons naturally interface with binary synapses, and support fast interface (e.g., under 10 nsec) with a crossbar array for interconnecting the neurons (whereas analog-only neurons require a long time (0.1 ms) current flow). The mixed-mode neurons separate the processes of accumulation (digital state counter) and decay (analog RC circuit).

A low-power event-driven (LPED) electronic neuron circuit is a hardware realization of the LL-IF neuron described hereinabove. The LPED electronic neuron services events quickly to free up valuable resources (e.g., access to the crossbar array). A purely event-driven electronic neuron according to an embodiment of the invention provides improved service time (e.g., less than a few nanoseconds per event) with low dynamic power consumption, since events arrive at a relatively slow rate (e.g., each neuron receives on average 10,000 inputs×10 Hz=$10^5$ events/sec).

Figure 11:
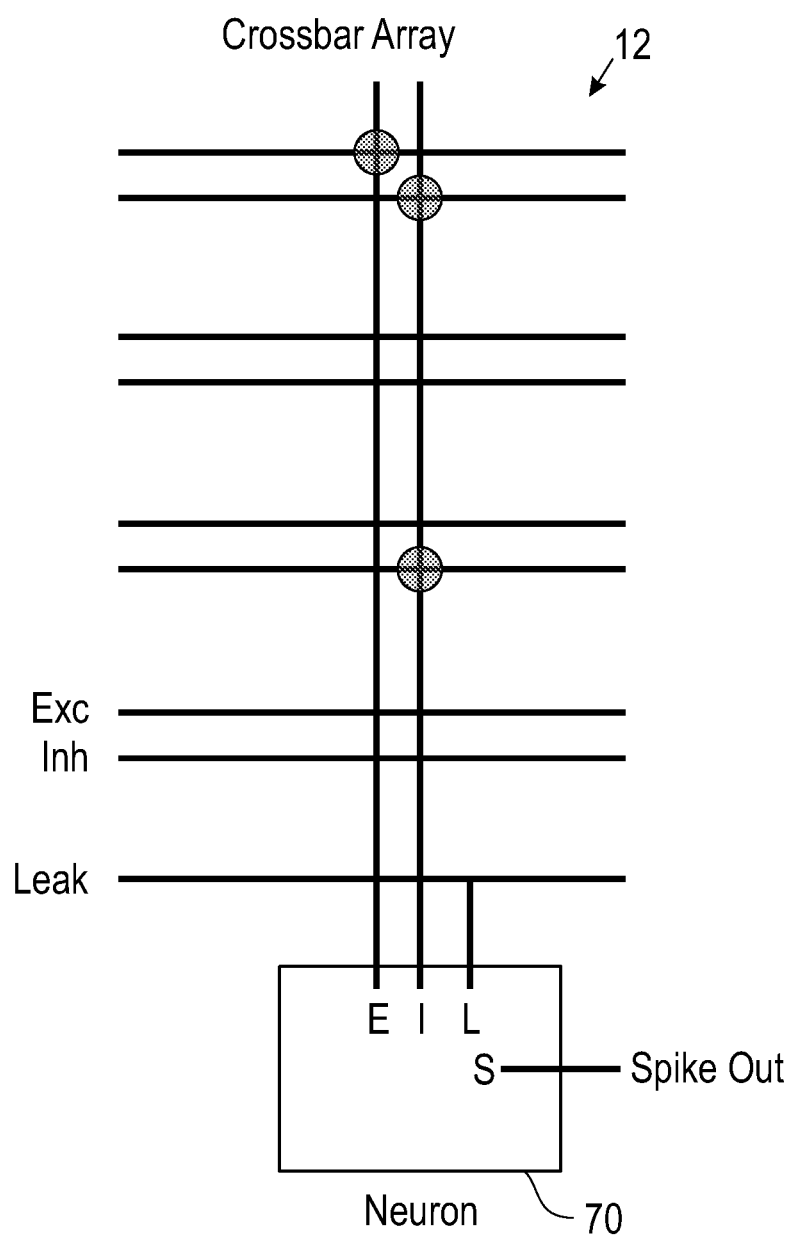
FIG. 11 shows a diagram of an integrate and fire low-power event-driven electronic neuron and crossbar array, in accordance with an embodiment of the invention.
Figure 12:
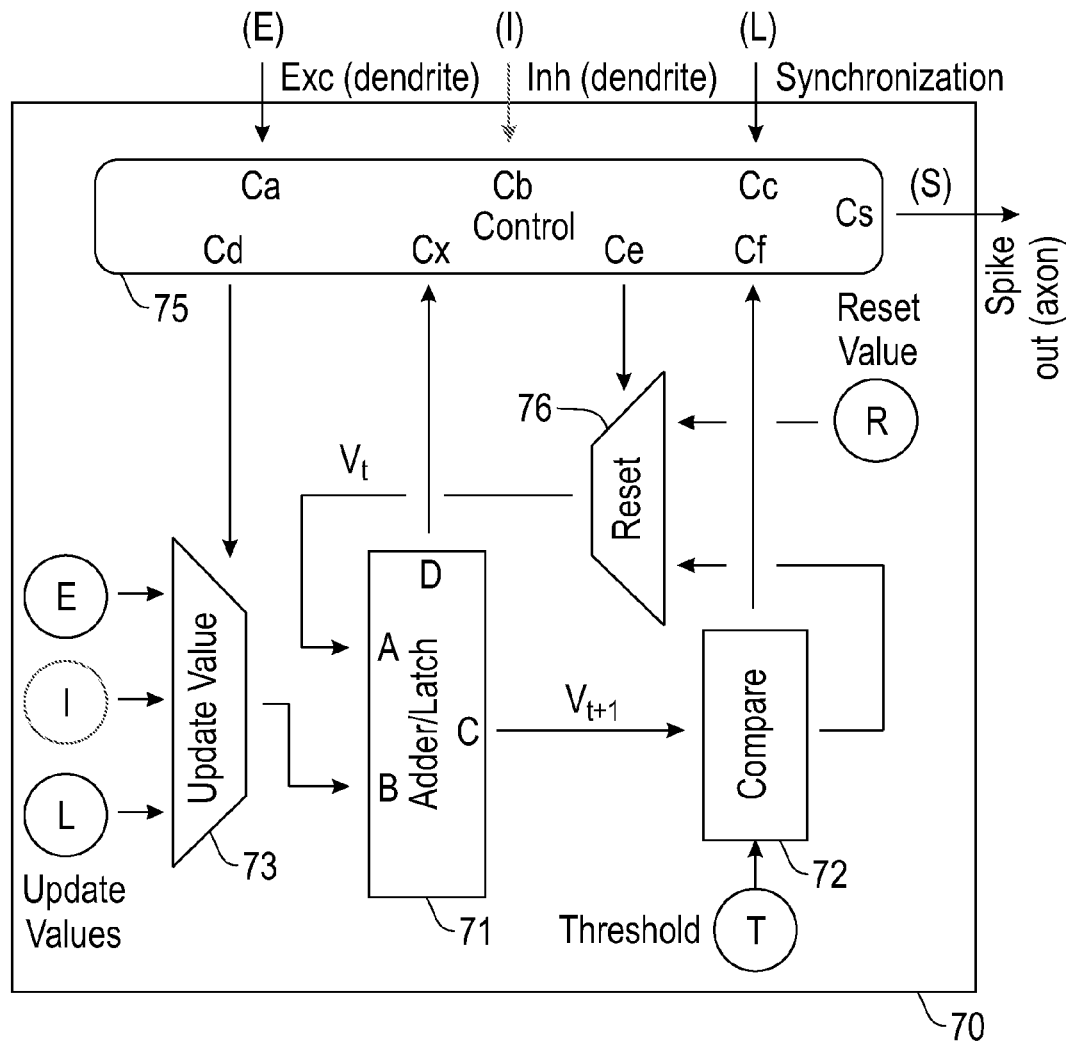
FIG. 12 shows a diagram of the integrate and fire low-power event-driven electronic neuron of FIG. 11, in accordance with an embodiment of the invention.

FIG. 11 shows a diagram of a LPED electronic neuron 70, according to an embodiment of the invention, connected to a crossbar array circuit 12. FIG. 12 shows a more detailed diagram of a circuit for the LL-IF LPED electronic neuron 70 of FIG. 11, according to an embodiment of the invention. The neuron parameters (e.g., 8-bit signed values) include: excitatory synaptic strength (E), inhibitory synaptic strength (I), leak strength (L), reset value (R), and threshold (T).

In this embodiment, the LPED electronic neuron 70 receives synaptic events on two dendritic channels (Exc and Inh), which can arrive from a multitude of sources, including a crossbar array, a virtualized network, or directly from axons originating from other neurons. Events arrive in a mutually exclusive manner (one at a time), and each event is fully processed by the LPED electronic neuron 70 before accepting another event. In another embodiment, event arrival is not restricted to be exclusive; however, the LPED electronic neuron 70 is then required to arbitrate among its inputs selecting one at a time. The LPED electronic neuron 70 also receives a synchronization event on a separate channel. For its output, the LPED electronic neuron 70 sends spike events on an axon channel.

In event-driven neuron systems, the order in which events arrive is not deterministic due to arbitration. Even in the presence of non-deterministic event arrival, the LPED neuron can be made to exactly match a software description by breaking computation in two phases: 1) A synaptic update phase, wherein all pending synapse events are processed in the time window t (the neuron membrane potential $V_t$ is updated one event at a time) and 2) A compute spike phase, where $V_t$ is compared against a threshold to determine if there is a spike event. The LPED neuron behaves deterministically because the order in which the events are processed in the first phase does not change the final value of $V_t$ (since the neuron is linear), before checking for a spike.

The neuron 70 includes a control module 75, an update value module 73, a reset module 76, an adder/latch module 71, and a comparison module 72. The control module 75 has 5 input channels, Ca and Cb for synapse events, Cc for a synchronization event, Cx for determining the sign of $V_t$ (positive or negative), and Cf for determining the condition $V_t$>T (threshold). The neuron 70 has 3 output channels, Cd for selecting the value to update $V_t$, Ce for resetting $V_t$, and Cs for sending spike event. The update value module 73 stores the values of possible updates to $V_t$, and has 3 values to select from (8-bit signed numbers), E, I, and L. The value is selected by Cd from control module 75, and sent to the adder/latch module 71. The adder/latch module 71 performs an 11-bit signed addition of $V_t$ as A with the value B, to produce the sum $V_{t+1}$ on C, and sends the sign of the addition on D. The sum is stored in a latch at the output of the adder 71. The reset module 76 either replaces $V_t$ with a reset value R, or sends $V_{t+1}$ unchanged, conditioned on Ce from the control module 75. The comparison module 72 compares $V_{t+1}$ to T and sends the result to control module 75 on Cf.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons. Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
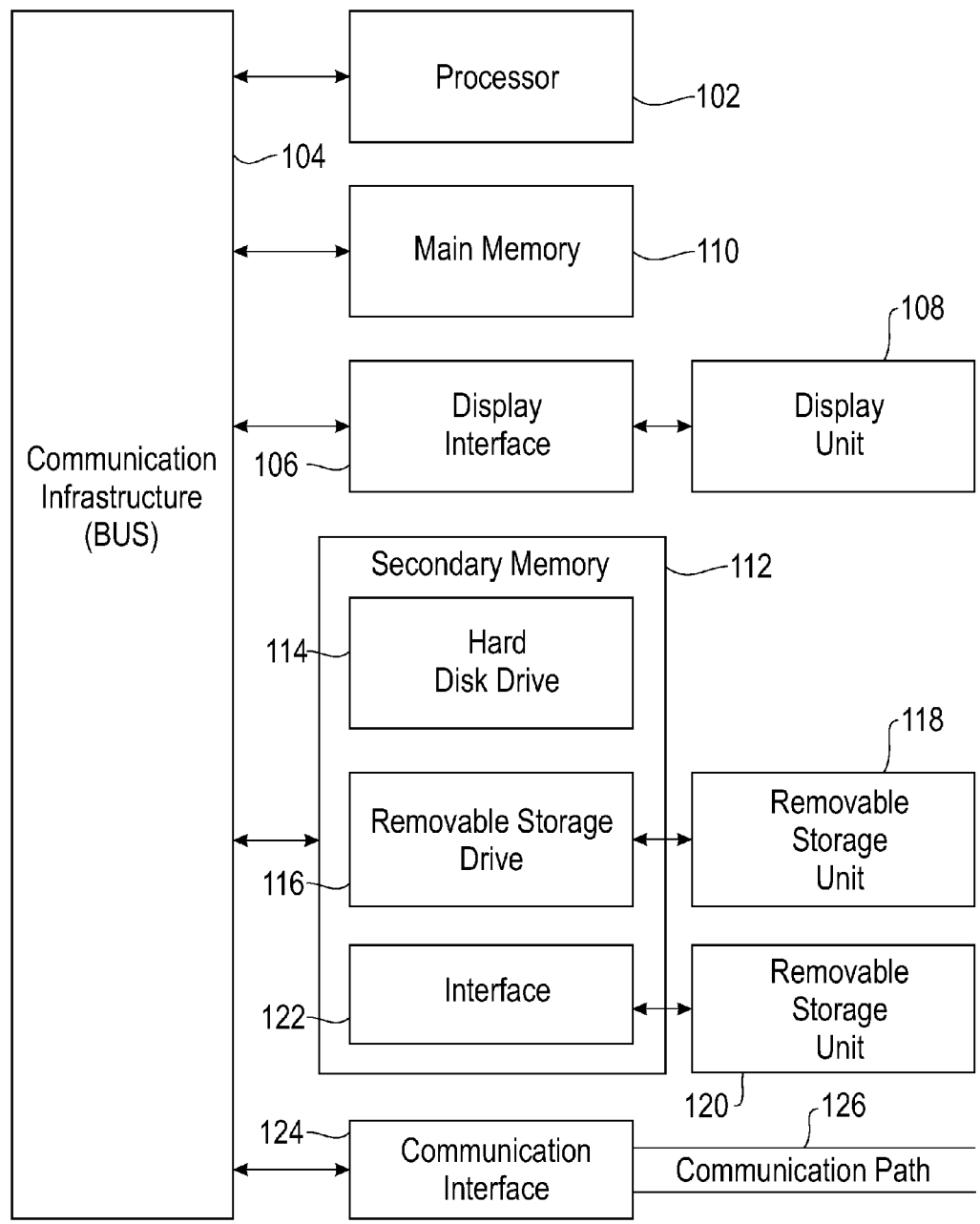
FIG. 13 shows a high-level block diagram of an information processing system useful for implementing one embodiment of the invention.

FIG. 13 is a high level block diagram showing an information processing system useful for implementing one embodiment of the present invention. The computer system includes one or more processors, such as a processor 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
in response to an external spike signal in an integrate and fire electronic neuron, updating a digital membrane potential based on the external spike signal, wherein the digital membrane potential represents a neuron membrane potential;
decaying the digital membrane potential based on a leak rate; and
upon the digital membrane potential exceeding a threshold, generating a spike signal.

2. The method of claim 1, wherein updating the membrane potential comprises:
upon receiving external excitatory spike signals, increasing the membrane potential by an increment equal to the number of excitatory spike signals received in a time step, multiplied by a first scaling parameter; and
upon receiving external inhibitory spike signals, decreasing the membrane potential by a decrement equal to the number of inhibitory spike signals received in a time step, multiplied by a second scaling parameter.

3. The method of claim 2, wherein:
the first scaling parameter is a multiple of 2, such that multiplication of the number of the received excitatory spikes by the scaling factor is performed by a digital bit shift operation.

4. The method of claim 2, wherein:
the second scaling parameter is a multiple of 2, such that multiplication of the number of the received excitatory spikes by the scaling factor is performed by a digital bit shift operation.

5. The method of claim 4, wherein:
decaying the membrane potential comprises decaying the membrane potential based on a leak rate equal to a current value of the membrane potential divided by a time constant.

6. The method of claim 5, wherein:
the time constant is a multiple of 2 such that dividing the membrane potential by the time constant value is performed by a digital bit shift-operation.

7. The method of claim 4, wherein:
updating the membrane potential comprises, upon receiving an inhibitory spike signal, increasing an inhibitory channel conductance value.

8. The method of claim 7 further comprising:
decaying the inhibitory channel conductance value based on a leak rate equal to a current value of the inhibitory channel conductance value divided by a time constant, wherein the time constant is a multiple 2 such that dividing the inhibitory channel conductance value by the time constant is performed by a bit shift-operation; and
applying inhibition into the membrane potential by decreasing the membrane potential based on the inhibitory channel conductance value.

9. The method of claim 8, wherein:
applying inhibition into the membrane potential comprises subtracting from the membrane potential a current value of the membrane potential value divided by a divisor value, wherein the divisor value comprises 2 to a power equal to a scaling factor minus the most significant non-zero bit in the inhibitory channel conductance value.

10. The method of claim 4, further comprising:
modeling synaptic channel conductance in the electronic neuron as a difference of two inhibitory channel conductance variables which increase by a strength factor with each external spike signal; and
decaying the conductance variables based on a decay rate governed by a time constant, wherein the time constant is a multiple of 2 such that the decay is performed through a digital bit shift operation.

11. The method of claim 10, further comprising:
applying inhibition into the membrane potential by subtracting from the membrane potential a current value of the membrane potential divided by a divisor value, wherein the divisor value is 2 to a power equal to a scaling factor minus the most significant non-zero bit in the value of the difference of the inhibitory channel conductance variables; and
applying excitation into the membrane potential by adding a membrane potential complement value to an excitatory strength shift factor using a bit shift operation to generate a sum, and dividing the sum by a divisor that is 2 to a power equal to a scaling factor minus the most significant non zero bit in the value of the difference of the excitatory channel conductance variables.

12. An integrate and fire electronic neuron, comprising:
a digital counter representing a membrane potential of the neuron;
a controller configured for updating the membrane potential based on external spike signals, by:
upon receiving an external excitatory spike signal, incrementing the membrane potential by an increment using bit-wise operations such that only bits in the counter that need change are modified; and upon receiving an external inhibitory spike signal, decrementing the membrane potential by a decrement using bit-wise operations such that only bits in the counter that need change are modified;

a decay module configured for decaying the membrane potential based on a time constant using an analog resistor-capacitor model; and a spiking module configured for, upon the membrane potential exceeding a threshold, generating a spike signal.

13. The integrate and fire electronic neuron of claim 12, wherein:

the decay module is configured for decaying the membrane potential by generating decay events based on a time constant using an analog resistor-capacitor model.

14. The integrate and fire electronic neuron of claim 13, wherein:

when a decay event occurs, if most-significant-bit of the counter is one, the most-significant-bit of the counter is set to zero, otherwise all lower-order bits of the counter are set to zero.

15. The integrate and fire electronic neuron of claim 14, wherein:

when the neuron generates a spike signal, the capacitor is quickly discharged, and charged at a charging rate, and upon the charge reaching a threshold, a decay event is generated.

16. The integrate and fire electronic neuron of claim 14, wherein:

when the neuron generates a spike signal, the capacitor is quickly discharged, and charged at a charging rate, and upon the charge reaching a first threshold, a decay event is generated; and the capacitor is discharged at a rate, and upon the charge reaching a second threshold, a decay event is generated.

17. The integrate and fire electronic neuron of claim 13, wherein:

the resistor-capacitor model comprises two capacitors; and
the electric potential of the membrane is decayed by:
when the neuron generates a first spike signal, quickly discharging a first capacitor while switching to a second capacitor; and
when the neuron generates a second spike signal, quickly discharging the second capacitor while switching to the first capacitor.

18. A method, comprising:

upon receiving an external spike signal in an event driven integrate and fire electronic neuron, updating a digital membrane potential of an electronic neuron based on the external spike signal;

decaying the membrane potential based on a leak rate; and
upon the membrane potential exceeding a threshold, generating a spike signal;

wherein, updating the membrane potential further comprises, when an excitatory event type occurs, incrementing the membrane potential by an excitatory synaptic strength increment.

19. The method of claim 18, wherein:

updating the membrane potential further comprises, when an inhibitory event type occurs, decrementing the membrane potential by an inhibitory synaptic strength decrement.

20. The method of claim 19, wherein:

updating the membrane potential further comprises, when a decay event type occurs, decrementing the membrane potential by a leak strength decrement.

21. The method of claim 20, wherein:

generating a spike signal further comprises setting the membrane potential to a reset value.

22. The method of claim 18, wherein:

in response to a decay event occurring, the neuron transmitting a spike event if the membrane potential is above threshold, maintaining simulation and hardware correspondence.

23. An integrate and fire electronic neuron, comprising:

a digital membrane potential counter;

a controller module configured for, in response to an external spike signal in an integrate and fire electronic neuron, updating a digital membrane potential based on the external spike signal, wherein the digital membrane potential represents a neuron membrane potential;

a decay module configured for decaying the digital membrane potential based on a leak rate; and a spiking module configured for, upon the digital membrane potential exceeding a threshold, generating a spike signal.

24. The integrate and fire electronic neuron of claim 23, wherein:

the controller module is further configured for updating the membrane potential by:
upon receiving external excitatory spike signals, increasing the membrane potential by an increment equal to the number of excitatory spike signals received in a time step, multiplied by a first scaling parameter; and
upon receiving external inhibitory spike signals, decreasing the membrane potential by a decrement equal to the number of inhibitory spike signals received in a time step, multiplied by a second scaling parameter.

25. The integrate and fire electronic neuron of claim 24, wherein:

the first scaling parameter is a multiple of 2, such that multiplication of the number of the received excitatory spikes by the scaling factor is performed by a digital bit shift operation; and the second scaling parameter is a multiple of 2, such that multiplication of the number of the received excitatory spikes by the scaling factor is performed by a digital bit shift operation.

* * * * *